(12) United States Patent
Sekar et al.

(10) Patent No.: US 11,855,300 B2
(45) Date of Patent: *Dec. 26, 2023

(54) ELECTRIC VEHICLE BATTERY PACK HAVING EXTERNAL SIDE POUCH FOR ELECTRICAL COMPONENTS

(71) Applicant: RIVIAN IP HOLDINGS, LLC, Irvine, CA (US)

(72) Inventors: Vignesh Sekar, Westland, MI (US); Bruce Turner, Livonia, MI (US); Kyle Butterfield, Ladera Ranch, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,288

(22) Filed: May 17, 2022

(65) Prior Publication Data

US 2022/0352585 A1 Nov. 3, 2022

Related U.S. Application Data

(63) Continuation of application No. 16/681,653, filed on Nov. 12, 2019, now Pat. No. 11,367,918.

(60) Provisional application No. 62/760,701, filed on Nov. 13, 2018.

(51) Int. Cl.
| | |
|---|---|
| *H01M 50/296* | (2021.01) |
| *H01M 50/291* | (2021.01) |
| *H01M 50/202* | (2021.01) |
| *H01M 50/249* | (2021.01) |
| *H01M 50/271* | (2021.01) |
| *H01M 50/293* | (2021.01) |
| *H01M 50/204* | (2021.01) |

(Continued)

(52) U.S. Cl.
CPC ....... *H01M 50/296* (2021.01); *H01M 50/202* (2021.01); *H01M 50/204* (2021.01); *H01M 50/224* (2021.01); *H01M 50/227* (2021.01); *H01M 50/249* (2021.01); *H01M 50/271* (2021.01); *H01M 50/291* (2021.01); *H01M 50/293* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 4,455,357 A | 6/1984 | Rorer et al. | |
| 5,645,448 A * | 7/1997 | Hill | H01M 50/572 439/522 |
| 5,853,058 A | 12/1998 | Endo et al. | |

(Continued)

*Primary Examiner* — Gregg Cantelmo
(74) *Attorney, Agent, or Firm* — Haley Guiliano LLP

(57) ABSTRACT

Electric vehicle battery packs with external side enclosures for containing electrical connectors and other components therein. Each enclosure is sized to support various connectors or other components as desired, and may have a number of openings formed to provide interfaces for connecting various electric vehicle systems to the battery pack. The enclosures may be placed at various locations along one or more sides of the battery pack, and connectors may be routed over an upper surface of a battery pack frame or through a gap formed between the pack frame and cover. Enclosures may be made of any material, including plastic for lower weight applications and metal for improved electromagnetic interference shielding.

19 Claims, 4 Drawing Sheets

(51) Int. Cl.
*H01M 50/227* (2021.01)
*H01M 50/224* (2021.01)

(56) References Cited

U.S. PATENT DOCUMENTS

| | | | |
|---|---|---|---|
| 6,494,279 B1 | 12/2002 | Hutchens | |
| 9,231,285 B2 | 1/2016 | Schmidt et al. | |
| 11,367,918 B2 * | 6/2022 | Sekar | H01M 50/296 |
| 2001/0029120 A1 * | 10/2001 | Miyazaki | H01R 13/6589 |
| | | | 439/98 |
| 2002/0132522 A1 * | 9/2002 | Miyazaki | H01R 13/74 |
| | | | 439/559 |
| 2010/0236913 A1 * | 9/2010 | Conrad | H01R 11/281 |
| | | | 439/627 |
| 2015/0017546 A1 | 1/2015 | Zhang | |
| 2015/0147618 A1 * | 5/2015 | Nakamori | B60K 1/04 |
| | | | 429/96 |
| 2015/0217707 A1 * | 8/2015 | Tanigaki | B60L 50/66 |
| | | | 180/65.1 |
| 2016/0006147 A1 * | 1/2016 | Loo | B60K 1/04 |
| | | | 439/500 |
| 2016/0118739 A1 * | 4/2016 | Tomine | H01R 31/08 |
| | | | 439/660 |
| 2017/0170438 A1 | 6/2017 | Jansen et al. | |
| 2018/0072184 A1 | 3/2018 | Lang et al. | |

\* cited by examiner

ELECTRIC VEHICLE BATTERY PACK HAVING EXTERNAL SIDE POUCH FOR ELECTRICAL COMPONENTS

CROSS REFERENCE TO RELATED APPLICATIONS

This application is a continuation of U.S. patent application Ser. No. 16/681,653, filed Nov. 12, 2019, now U.S. Pat. No. 11,367,918, which claims the benefit of U.S. Provisional Patent Application No. 62/760,701, filed Nov. 13, 2018, the disclosures of which are hereby incorporated by reference herein in their entireties.

INTRODUCTION

The present disclosure is directed to electric vehicle battery packs. More specifically, the present disclosure is directed to electric vehicle battery packs having external side pouches.

SUMMARY

A vital component of current electric vehicles is the battery pack. Conventional battery packs perform a number of functions, including providing a protective enclosure to withstand crashes, ground strikes, or other impacts, routing of electrical wires, and containment of battery fires.

Battery packs may have a frame that provides the structural rigidity and strength to withstand impact, a bottom layer, and a top cover or lid. Battery modules are contained within the frame, and the bottom layer and top cover are attached to the lower and upper surfaces of the frame, respectively, to enclose the batteries.

There are often space constraints limiting the size of battery packs. They should not extend beyond either side of the vehicle for example, and preferably lie only between the front and rear wheels. Further, they should be as low profile as possible to minimize any reduction in cabin space. In order to overcome the space requirements, some battery components of the present disclosure (e.g., electrical connectors, wires, and terminals) are repositioned from the interior of the frame to the exterior of the frame. One way connections are made between components inside and outside of a battery frame is to make holes in the sides of the frame. Such holes, however, undesirably weaken the frame. In order to avoid weakening the frame, the present disclosure makes connections by routing components through a space created between the frame and the top cover or bottom layer.

Accordingly, described herein is a side pouch enclosure for holding therein electrical connectors and other components against an outer surface of the frame. In some embodiments, the enclosure has an upper surface that lies approximately parallel to the upper surface of the frame, so that the top cover can be affixed to both the frame and the enclosure, sealing both. The cover is shaped to leave a gap between the frame and cover where the enclosure is positioned, so that electrical components can be run over the frame, through the gap, and into the enclosure. In this manner, the battery pack may provide electrical power to vehicle components exterior to the pack via terminals and connectors in the enclosure, without structurally compromising the battery pack frame and while satisfying space constraints within the battery pack. Further embodiments may employ a frame with lowered side walls in areas proximate to the enclosures, creating a gap between the top of the lowered side walls and the cover. Enclosures are placed over or adjacent to this gap, so that electrical components can be extended through the gap and into the enclosure.

The enclosure may be constructed of any material, including a plastic and/or a metal such as aluminum. Additionally, in some embodiments, enclosures of the disclosure may be positioned at any one or more locations along the outer surface of the frame. For instance, frames may be constructed with two opposing perpendicular surfaces, and angled surfaces positioned between the perpendicular surfaces. One or more enclosures may be placed along any of these surfaces.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to electric vehicle battery packs with external side enclosures for containing electrical connectors and other components therein. Each enclosure is sized to support various connectors or other components as desired, and may have a number of openings formed to provide interfaces for connecting various electric vehicle systems to the battery pack. The enclosures may be placed at various locations along one or more sides of the battery pack, and connectors may be routed over an upper surface of a battery pack frame or through a gap formed between the pack frame and cover. Enclosures may be made of any material, including plastic for lower weight applications and metal for improved electromagnetic interference shielding.

Figure 1:
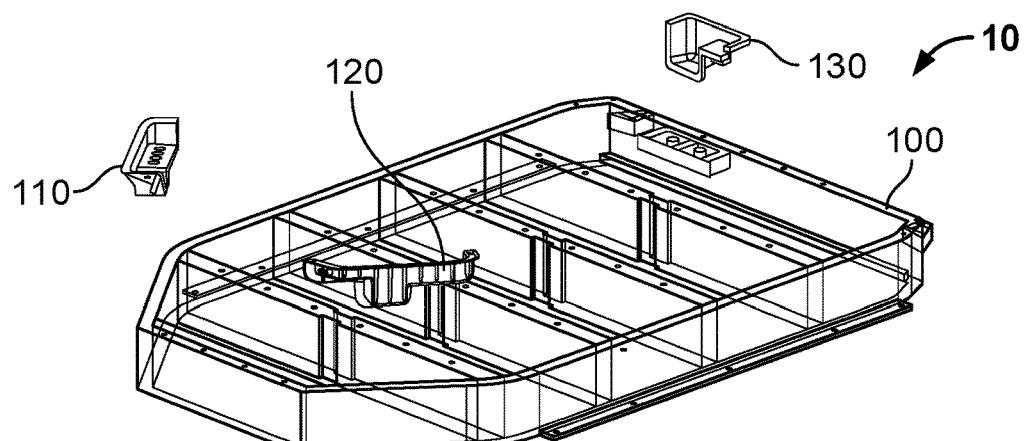
FIG. 1 is an isometric view of an electric vehicle battery pack assembly having enclosures for housing electrical connectors, and constructed in accordance with embodiments of the disclosure.
Figure 2:
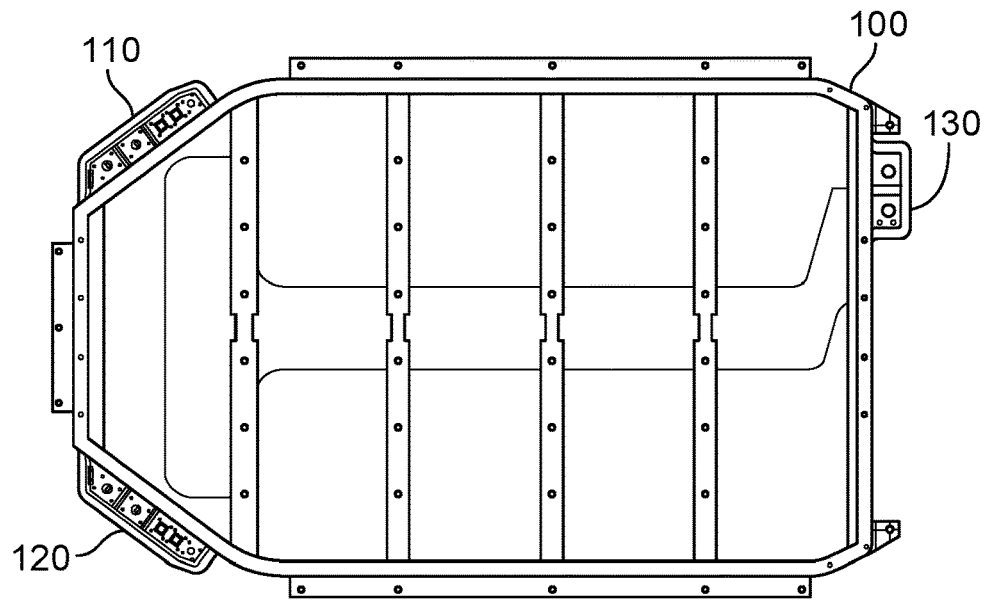
FIG. 2 is a plan view of the assembled electric vehicle battery pack and enclosures of FIG. 1.

FIG. 1 shows a battery pack frame assembly 10 with a frame 100 and a number of enclosures 110, 120, 130 that are attached thereto. Any number of enclosures 110, 120, 130 is contemplated, but here three such enclosures 110, 120, 130 are employed. As shown in FIG. 2, the enclosures 110, 120, 130 are each affixed to the outer surface of the frame 100, in various locations as desired. The enclosures 110, 120, 130 may be of any size and shape suitable for holding electrical connectors or terminals therein.

The enclosures 110, 120, 130 may also be made of any material suitable for forming a pouch or container capable of supporting one or more electrical connectors within. As one example, the enclosures 110, 120, 130 may be made of a plastic, which may result in weight savings. Plastic enclosures 110, 120, 130 may be formed by injection molding or any other suitable process. As another example, the enclosures 110, 120, 130 may be made of a metal such as aluminum, for increased strength and shielding against electromagnetic interference. In some embodiments, metal enclosures 110, 120, 130 may be made of die-cast aluminum of any wall thickness, such as 2.5-4.0 mm wall thickness or any other suitable value.

Figure 3:
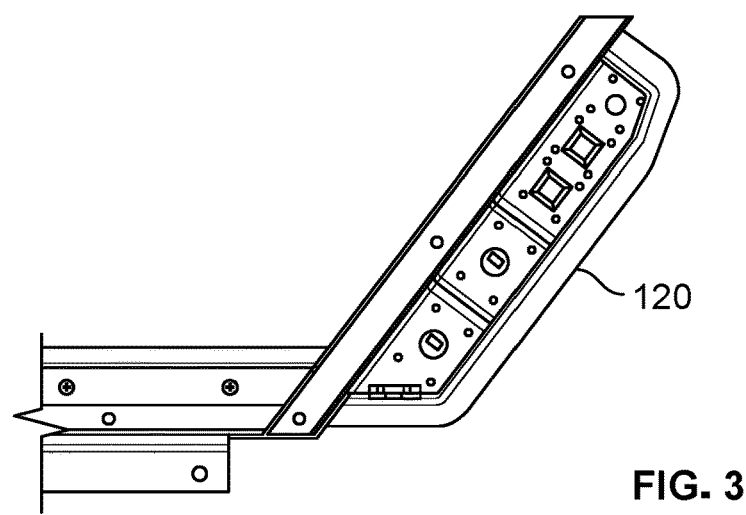
FIG. 3 is a magnified plan view of one of the enclosures constructed in accordance with embodiments of the disclosure.

FIG. 3 illustrates further details of one particular enclosure 120, although features shown may apply to any enclosures 110, 120, 130 of embodiments of the disclosure. As shown in FIG. 3, the enclosure 120 may be generally elongated, and form a pocket with the outer surface of the frame 100. A first side of the enclosure 120 is flat and is placed against the outer surface of the frame 100 to be attached thereto by any suitable attachment method, such as by an adhesive or screws. A second side, or the outer side of the enclosure 120, is opposite to the first side and faces away from the frame. An interior space is defined between the outer surface of the frame 100 and the second side of the enclosure 120, to act as a receptacle for any electrical elements. The enclosures 110, 120, 130 thus each provide an enclosed space in which one or more electrical components may be placed. Wires or other components may extend over the top of the frame, to be placed in the pocket of the enclosures 110, 120, 130. Two of the enclosures 110, 120 are shown as being located on angled sides of the frame 100 (in FIG. 2, the angled sides on the left end of the frame 100, between the horizontal or lengthwise side members 105 and the vertical member 115 on the far left), and another smaller enclosure 130 is shown as being located at a rear surface of the frame 100. The enclosures 110, 120, 130 may be located at any positions along the frame 100 subject to space and size requirements of the vehicle. As shown, the bottom of the enclosure 120 includes one or more openings, described in further detail below. High voltage lines and other cabling can be routed through the openings and the connectors can be packaged inside of the enclosure 120. In some embodiments, the high voltage lines that are packaged in the enclosures 110, 120, 130 are switched lines. Therefore, in the event of a crash where the integrity of the enclosure 120 is compromised, contactors inside the battery pack can be switched off to prevent short-circuiting of and damage to the battery modules inside of the battery pack.

Figure 4:
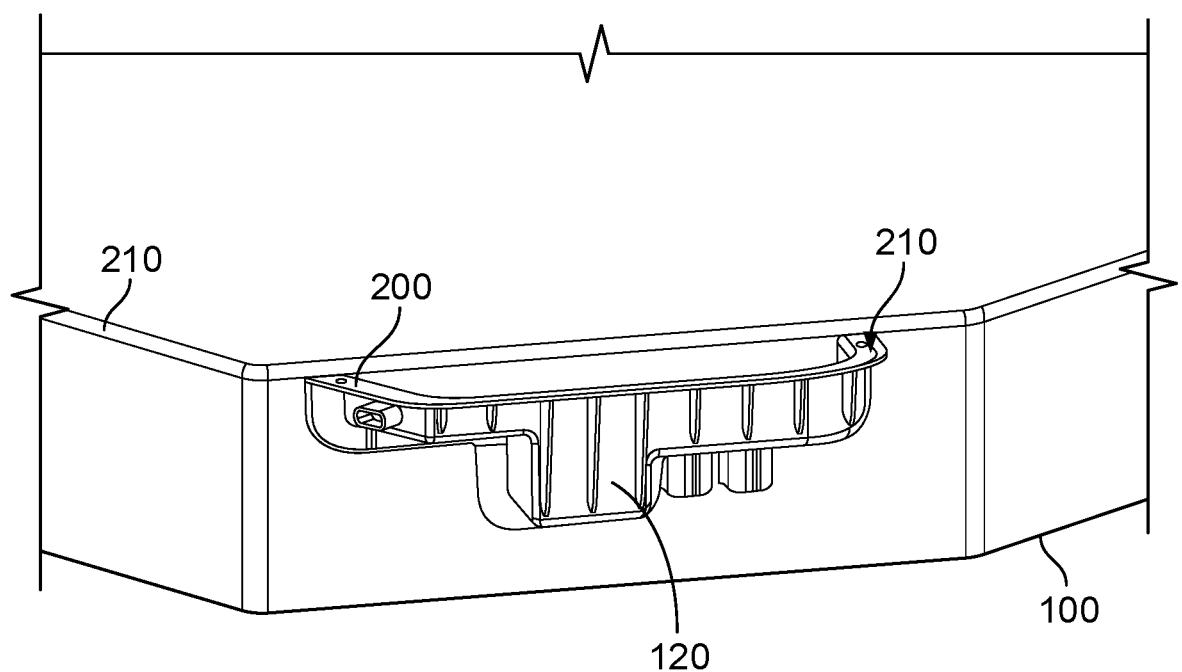
FIG. 4 is an isometric view showing further details of an exemplary enclosure constructed in accordance with embodiments of the disclosure.

As with FIG. 3, FIG. 4 illustrates further details of enclosure 120, although features disclosed may apply to any enclosures 110, 120, 130 of embodiments of the disclosure. As shown in FIG. 4, the enclosure 120 has flat upper surface 200 that lies flush with the upper surface 210 of the frame 100. In this manner, the upper surfaces of the frame 100 and enclosures 110, 120, 130 have a single height, providing a single surface for attachment of the cover and allowing the cover to form a seal over both the frame and the enclosure. It will be understood that in some embodiments, one or more enclosures 110, 120, 130 can be positioned to be flush with a lower surface of the frame 100. It will also be understood that the upper surfaces of the enclosures 110, 120, 130 need not necessarily have the same height as the upper surface 210 of the frame 100. Instead, the upper surfaces of the enclosures 110, 120, 130 may have different heights than the upper surface 210 of the frame 100, and the cover may also have differing elevations in regions corresponding to the enclosures 110, 120, 130, so as to seal the enclosures 110, 120, 130 even when they are of different heights from the frame 100. That is, the enclosures 110, 120, 130 may have heights different from that of the upper surface 210 of the frame 100, with the cover optionally also having differing heights to compensate for the difference in elevation between the enclosures 110, 120, 130 and the frame 100, and to seal the enclosures 110, 120, 130 and the frame 100 despite these differing elevations.

Figure 5:
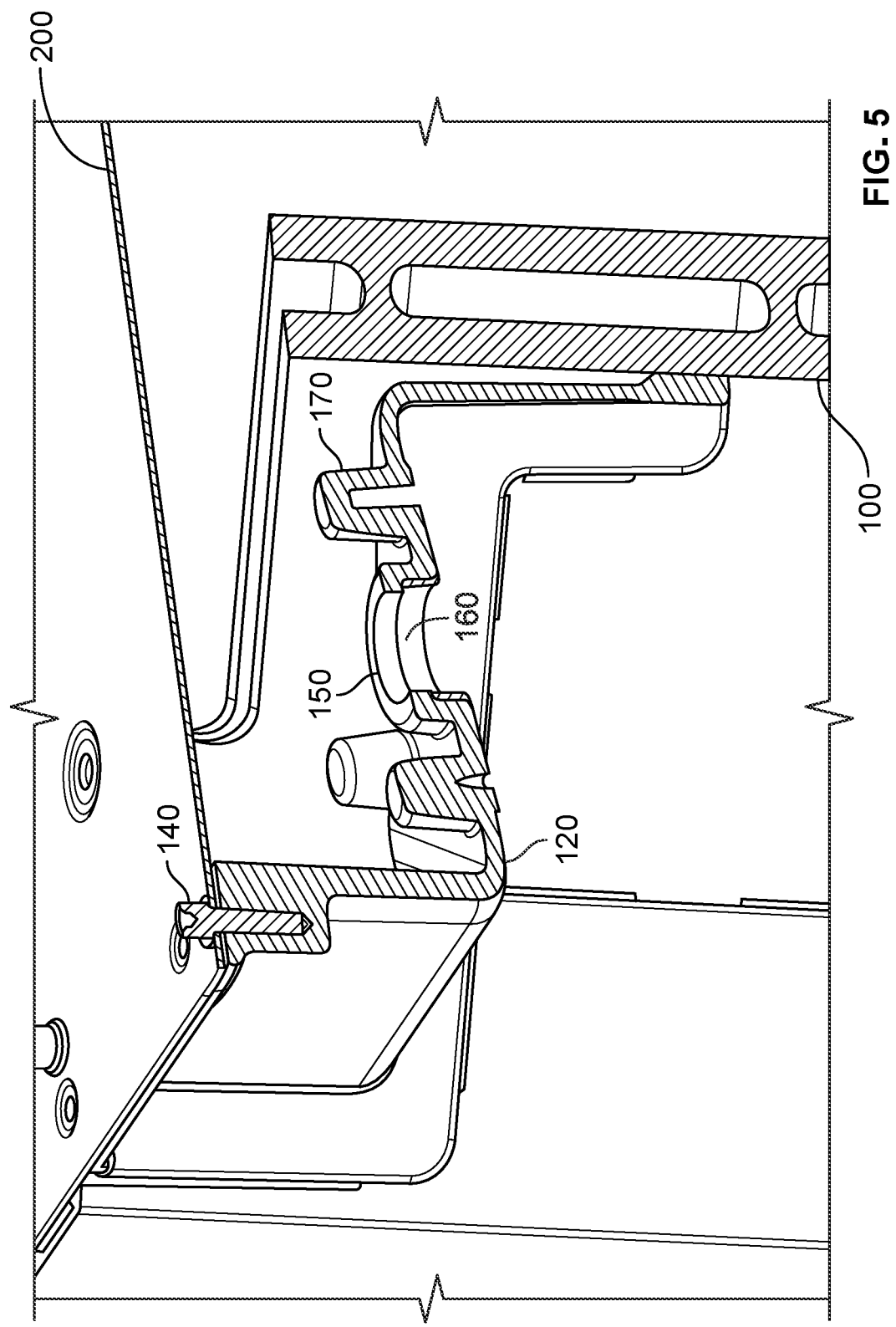
FIG. 5 is a cross-sectional view of an enclosure opening for electrical connectors, constructed in accordance with embodiments of the disclosure.

FIG. 5 is a cross-sectional view of enclosure 120 along with an exemplary opening for electrical connectors, constructed in accordance with embodiments of the disclosure. FIG. 5 illustrates an exemplary embodiment in which the upper surface 220 of frame 100 has a different elevation proximate to enclosure 120, creating an opening or gap between the upper surface 220 and the cover 250 through which electrical connectors, terminals, or other components may be passed. The enclosure 120 may be fastened to cover 250 in any manner, such as by fasteners 140 which can be any fasteners, including screws, nails, rivets, bolts, releasable fasteners, or the like. As described above, enclosure 120 also includes one or more openings 150 in its lower surface, through which electrical connectors may pass or to which electrical interfaces may be coupled. Openings 150 may have a metal insert 160 pressed therein, for electromagnetic interference shielding integrity and/or for more secure fastening of electrical connectors thereto. Insert 160 may be made of any metal, such as a brass or a steel, and may be pressed into opening 150 of a cast metallic enclosure 120. The insert 160 may be threaded if desired, for secure fastening of components thereto. Enclosure 120 may include any number of bosses 170 for receiving fasteners that may be used in securing an electrical terminal or other component in opening 150.

Figure 6:
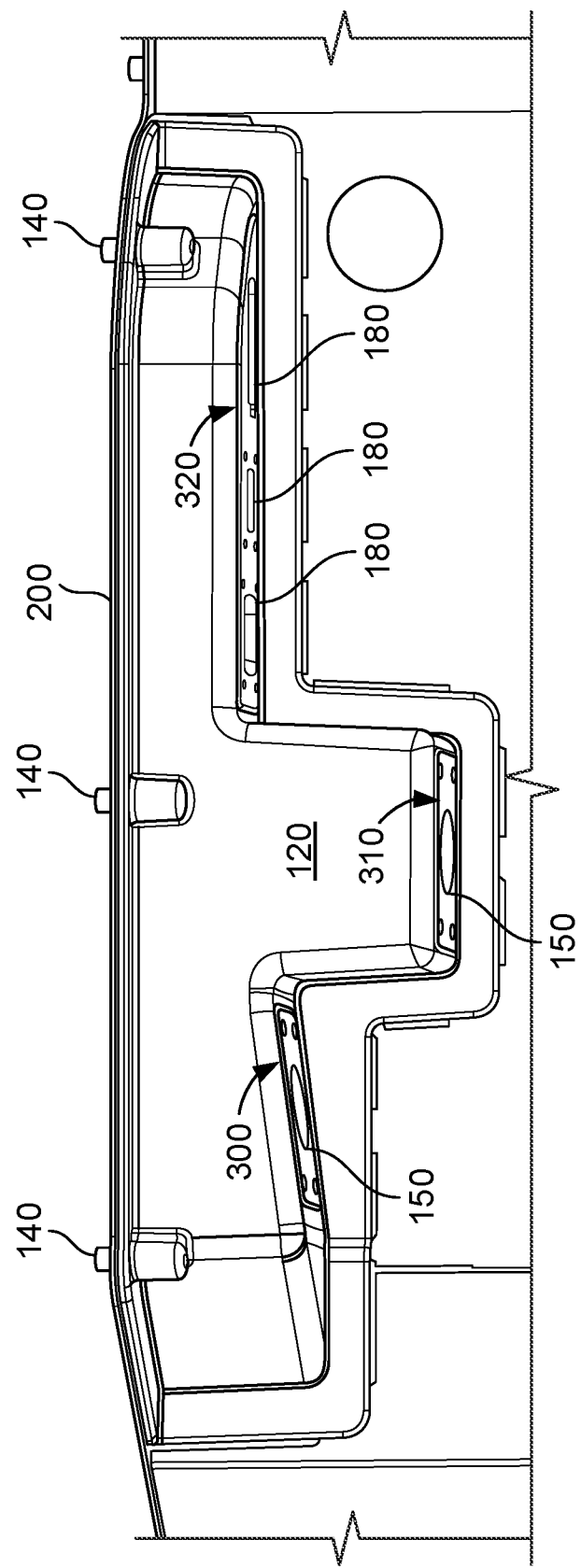
FIG. 6 is a side view of an exemplary enclosure constructed in accordance with embodiments of the disclosure.

FIG. 6 is a side view of an exemplary enclosure 120 constructed in accordance with embodiments of the disclosure. Features shown here in connection with enclosure 120 may be applied equally to any other enclosure 110, 130 of embodiments of the disclosure. Here, enclosure 120 has a lower surface with multiple different elevations, including a first section 300 with a lower surface oriented at an acute angle with respect to the upper surface 200, a second section 310 positioned lower than the first section 300 and oriented substantially parallel to upper surface 200, and a third section 320 positioned higher than both the first section 300 and second section 310 and also oriented substantially parallel to upper surface 200. The particular shape of enclosure 120 shown in FIG. 6 may correspond to the sizes and shapes of the various components contained within, although any shape and dimensions of enclosure 120 are contemplated. Any number of openings 150 may be formed in any lower or other surface of any of the first, second, or third sections 300, 310, 320. As shown, each of the first and second sections 300, 310 has one opening 150, although embodiments of the disclosure contemplate any number of openings 150 in any portion of enclosure 120. Additionally, the size and shape of enclosure 120, and any of its particular dimensions, may vary according to any factor, such as the size and desired position of any components intended to be housed within, space constraints within the vehicle, or any other factor.

Enclosure 120 also includes any number of additional openings 180, which are openings of any shape, formed or cut in any surface of enclosure 120. The additional openings 180 may be shaped to receive electrical connectors, terminals, or other interfaces for placing vehicle or other components in electrical communication with any components contained within battery pack assembly 10, such as batteries.

Each enclosure 110, 120, 130, and each of its openings 150, 180 may be sized and shaped to accommodate any electrical connectors, terminals, or other components that may be utilized in connection with an electric vehicle. For example, enclosures 110, 120, 130 and openings 150, 180 may be sized to accommodate fiber distribution units (FDUs) and their connectors, direct current fast charge (DCFC) modules or connectors, on-board charger (OBC) components, cables, or connectors, remote diagnostic unit (RDU) components or connectors, and the like.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, any number of enclosures may be applied to a battery pack, of any size and constructed of any nonconductive material. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. An enclosure comprising:
   an open first side configured to be attached to a battery pack so as to define a space between the enclosure and the battery pack;
   an open second side forming a continuous opening with the open first side and comprising an upper surface configured to be attached to a cover;
   a first external lower surface positioned at a first elevation; and
   a second external lower surface positioned at a second elevation different than the first elevation,
   wherein the first external lower surface and the second external lower surface are oriented substantially parallel to the upper surface of the enclosure, and
   wherein there is an opening formed in the first external lower surface.

2. The enclosure of claim 1, wherein the opening formed in the first external lower surface is configured to accommodate one or more connectors for one or more electrical components extending from an interior of the battery pack into the space.

3. The enclosure of claim 1, wherein:
   the enclosure comprises one or more of plastic or metal; and
   the enclosure is a die-cast or injection molded enclosure.

4. The enclosure of claim 1, wherein the enclosure further comprises:
   an outer side extending away from the battery pack so as to define the space when the open first side is attached to the battery pack, wherein the outer side comprises the first external lower surface and the second external lower surface.

5. The enclosure of claim 1, wherein:
   the upper surface of the enclosure comprises a substantially flat upper surface arranged substantially parallel to an upper surface of a frame of the battery pack when the open first side is attached to the battery pack.

6. The enclosure of claim 1, further comprising a third external lower surface positioned at a third elevation different than the first and second elevations, wherein:
   the third external lower surface comprises an opening formed therein.

7. An apparatus comprising:
   a frame for one or more batteries, the frame having a surface;
   an enclosure attached to the surface of the frame, the enclosure comprising:
   a first lower surface positioned at a first elevation; and
   a second lower surface positioned at a second elevation different than the first elevation; and
   a cover attached to an upper surface of the frame and an upper surface of the enclosure.

8. The apparatus of claim 7, wherein the cover is attached to the upper surface of the frame and the upper surface of the enclosure with a gap between the upper surface of the frame and the cover, the gap positioned proximate to the enclosure.

9. The apparatus of claim 8, wherein:
   the enclosure is a first enclosure;
   the gap is a first gap;
   the apparatus further comprises a second enclosure affixed to the surface of the frame; and
   the cover is attached to an upper surface of the second enclosure with a second gap between the upper surface of the frame and the cover, the second gap positioned proximate to the second enclosure.

10. The apparatus of claim 8, wherein the upper surface of the enclosure is oriented substantially parallel to the upper surface of the frame.

11. The apparatus of claim 8, wherein the upper surface of the frame has a third elevation proximate to the enclosure and a fourth elevation removed from the enclosure, the third elevation being lower than the fourth elevation.

12. The apparatus of claim 8, further comprising one or more electrical components extending from an interior space of the frame into the enclosure through the gap.

13. The apparatus of claim 12, wherein the enclosure further comprises one or more openings formed therein and configured to accommodate one or more connectors for the one or more electrical components.

14. The apparatus of claim 7, wherein the surface of the frame comprises a first surface oriented along a first direction, the first direction being a lengthwise direction of the frame, a second surface oriented substantially perpendicular to the first direction, and a third surface oriented at an acute angle with respect to the first surface and the second surface.

15. The apparatus of claim 14, wherein the enclosure is positioned on the third surface.

16. The apparatus of claim 14, wherein the enclosure is positioned on the second surface.

17. An apparatus, comprising:
   a frame defining an interior space within for one or more batteries, the frame having an outer surface;
   a first enclosure attached to the outer surface;
   a cover attached to the outer surface and an upper surface of the first enclosure with a first gap between the outer surface of the frame and the cover, the first gap positioned proximate to the first enclosure;
   a second enclosure attached to the outer surface; and
   the cover is attached to an upper surface of the second enclosure with a second gap between the outer surface of the frame and the cover, the second gap positioned proximate to the second enclosure.

18. The apparatus of claim 17, wherein:
   the outer surface comprises a plurality of sides; and the first enclosure and the second enclosure are attached to different sides of the outer surface among the plurality of sides.

19. The apparatus of claim 17, further comprising:
one or more first electrical components extending from the interior space of the frame into the first enclosure through the first gap; and
one or more second electrical components extending from the interior space of the frame into the second enclosure through the second gap.

* * * * *